(12) United States Patent
Shirodkar

(10) Patent No.: US 6,417,289 B1
(45) Date of Patent: Jul. 9, 2002

(54) PROCESS FOR PRODUCING LLDPE FILMS WITH IMPROVED IMPACT STRENGTH

(75) Inventor: Pradeep P. Shirodkar, Somerset, NJ (US)

(73) Assignee: ExxonMobil Oil Corporation, Fairfax, VA (US)

( * ) Notice: Subject to any disclaimer, the term of this patent is extended or adjusted under 35 U.S.C. 154(b) by 0 days.

(21) Appl. No.: 08/934,192

(22) Filed: Sep. 19, 1997

Related U.S. Application Data

(62) Division of application No. 08/364,150, filed on Dec. 27, 1994, now Pat. No. 5,756,203.

(51) Int. Cl.⁷ .............................. C08J 5/18; C08J 3/24; C08K 5/14
(52) U.S. Cl. ................ 525/387; 525/333.8; 528/502 R; 528/503; 264/209.3; 264/211.12; 264/564; 264/331.17; 264/DIG. 42
(58) Field of Search ............................... 525/333.8, 387; 428/334, 335, 339, 500; 264/564, 209.3, 211.12, 331.17, DIG. 42; 528/502, 503

(56) References Cited

U.S. PATENT DOCUMENTS

| | | | | |
|---|---|---|---|---|
| 4,118,453 A | | 10/1978 | Herrington | 264/89 |
| 4,578,431 A | * | 3/1986 | Shaw et al. | 525/387 |
| 4,606,879 A | * | 8/1986 | Cerisano | 264/569 X |
| 4,820,471 A | | 4/1989 | van der Molen | 264/564 |
| 4,832,897 A | | 5/1989 | van der Molen | 264/564 |
| 5,756,203 A | * | 5/1998 | Shirodkar | 428/339 |

* cited by examiner

Primary Examiner—Fred Teskin

(57) ABSTRACT

LLDPE films with superior impact strength are obtained by blowing lightly crosslinked LLDPE resins under film extrusion conditions typically used for blowing HDPE film.

4 Claims, 2 Drawing Sheets

PROCESS FOR PRODUCING LLDPE FILMS WITH IMPROVED IMPACT STRENGTH

This is a division of application Ser. No. 08/364,150, filed on Dec. 27, 1994, now U.S. Pat. No. 5,756,203.

FIELD OF THE INVENTION

The invention relates to compositions comprising a linear low density copolymer of ethylene and an alpha-olefin containing 4 to 10 carbon atoms (LLDPE), and to films of improved properties formed from such compositions.

BACKGROUND OF THE INVENTION

Linear low density polyethylene is ethylene copolymerized with alpha olefins of 3 to 10 carbon atoms. Improvements in impact resistance of films of linear low density polyethylene (hereinafter "LLDPE") are desirable. Normal LLDPE resins lacks the melt strength required to blow films under high stalk extrusion conditions, often used to blow HMW-HDPE, which result in excellent film impact properties. One recent exception is a DMAC ["DMAC being an acronym for dimethylaluminum chloride] cocatalyzed LLDPE resins. A high molecular weight component of the DMAC cocatalyzed LLDPE resins is accompanied by an increased melt strength required to be blown into film under high stalk conditions used in HDPE film production.

SUMMARY OF THE INVENTION

In the present invention, the melt strength of LLDPE is increased by treatment with low levels of peroxides. Low levels of crosslinking of the LLDPE results with low levels of peroxides. This allows the LLDPE to be blown into film under high stalk conditions. The treated LLDPE can be fabricated with improved processability into blown films having improved impact properties. The impact strengths of these LLDPE films is significantly higher than that of films from uncrosslinked LLDPE films blown under non-stalk conditions.

DETAILED DESCRIPTION OF THE INVENTION

Figure 1:
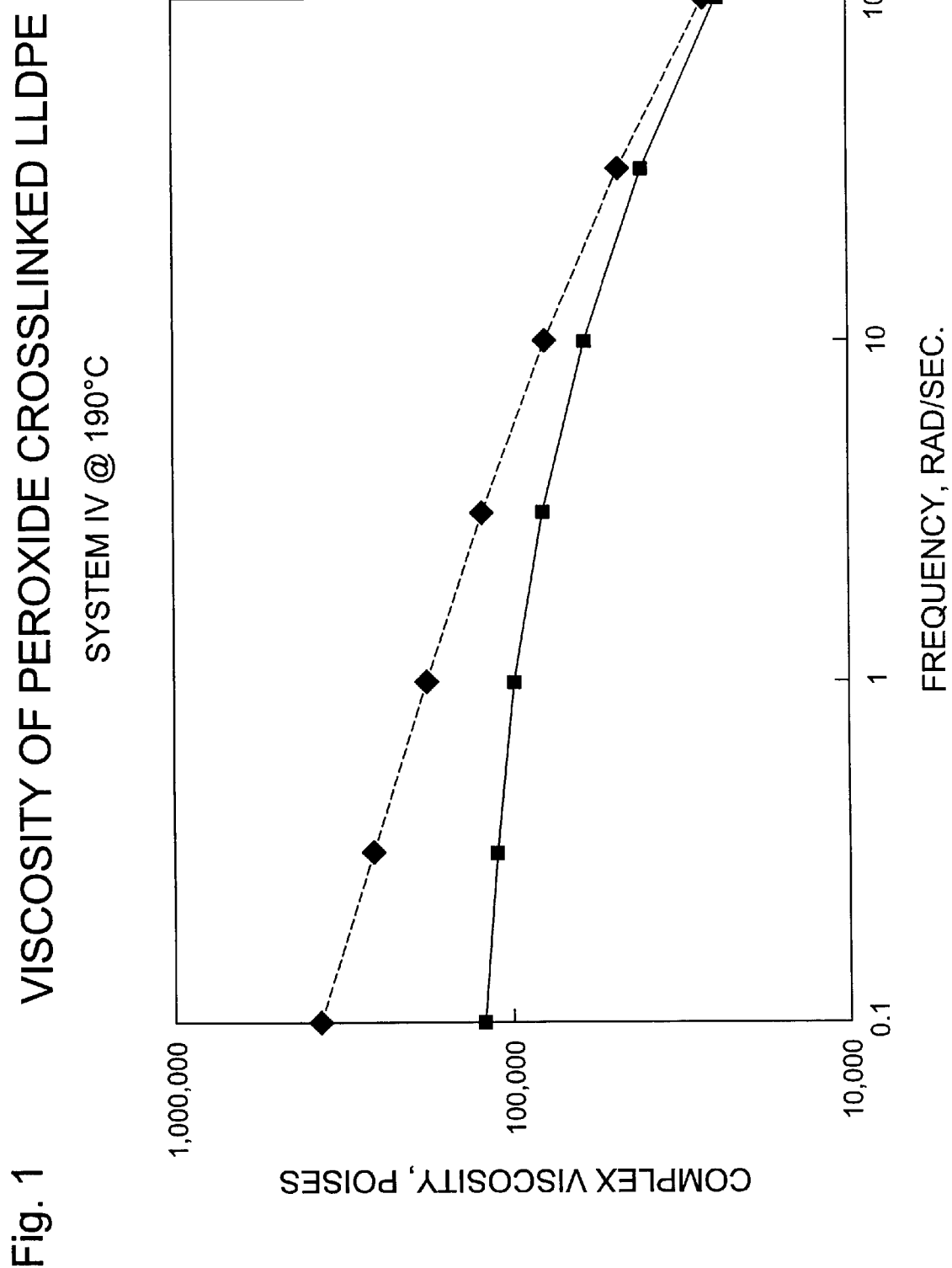
FIG. 1 illustrates viscosity of peroxide crosslinked LLDPE and is a plot of complex viscosity, poises vs. frequency, rad/sec.
Figure 2:
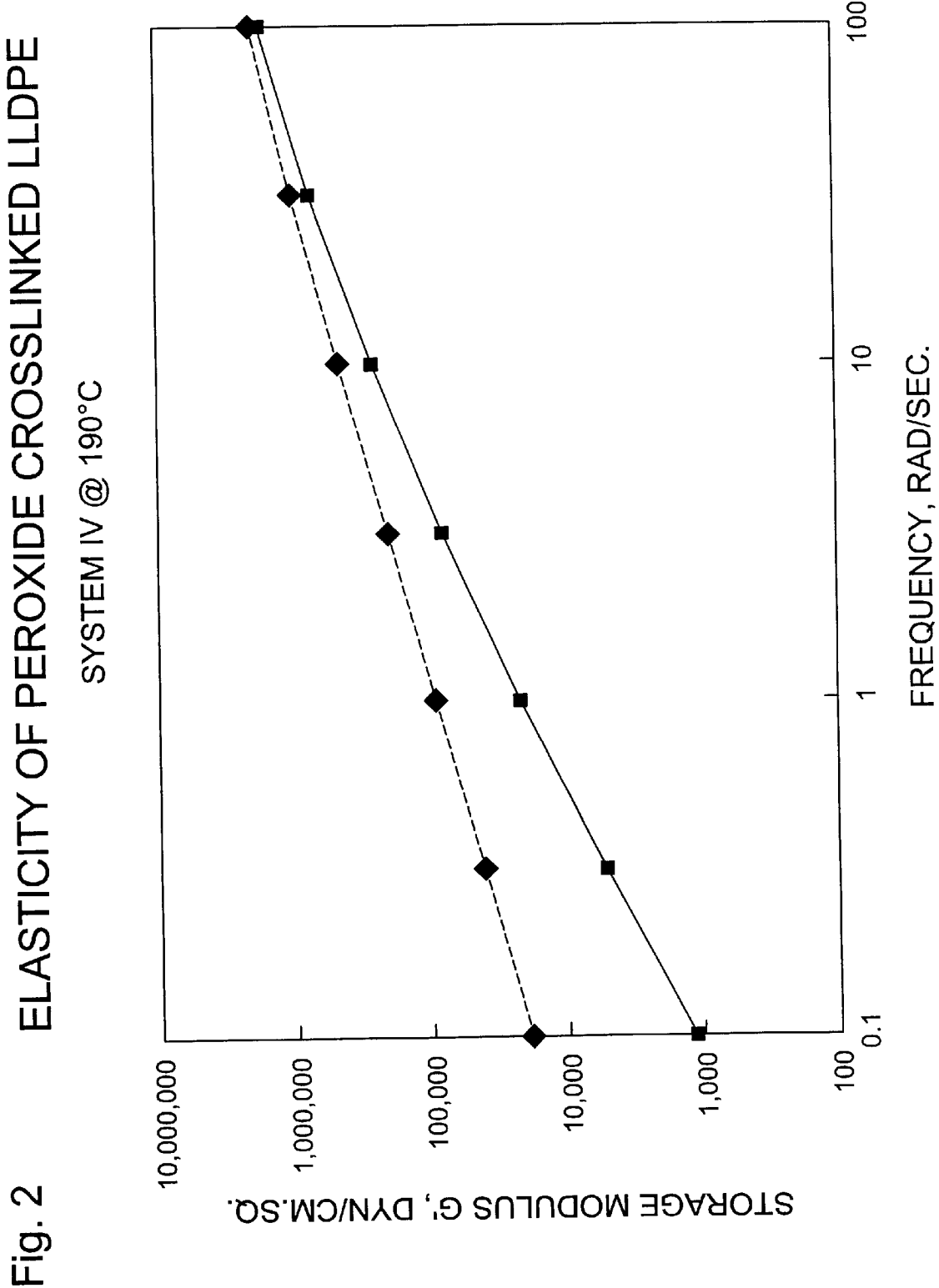
FIG. 2 is Elasticity of peroxide crosslinked LLDPE and is a plot of storage modulus G', dyn/cm.sq vs. frequency rad/sec.

The linear low density ethylene copolymers (LLDPE) of this invention are linear copolymers of ethylene and a minor amount, preferably about 2 to 10 weight percent of an olefin, preferably a 1-olefin, containing 4 to 10 carbon atoms and having a density of about 0.9 to 0.94, preferably having a density of about 0.90 to about 0.93, a melting point of about 110° to 130° C., and a melt index of about 0.05 to 10. The LLDPE will contain more than 70%, preferably greater than 80%, ethylene units in the backbone. The preferred olefin comonomers are 1-butene, 1-hexene and 1-octene. The LLDPE may be prepared by any of various methods known in the art, e.g., by relatively low pressure methods as disclosed, for example, in U.S. Pat. No. 4,076,698. As is known in the art, these polymers or copolymers are formed in the presence of Ziegler-Natta, Metallocene or Phillips catalysts containing titanium, chromium, zirconium, magnesium, and admixtures thereof which give rise to the catalyst residues in the as-polymerized [as-synthesized] resin.

The amount of peroxide used to treat the LLDPE to increase the melt strength in this invention can range from 10 to 1000 ppm. However, preferably, the peroxide amount ranges from 20 to 500 based on the LLDPE weight. Most preferably, the peroxide of the blend is about 50–200 ppm.

The types of peroxides which are used are high temperature peroxides that can undergo almost complete decomposition at normal compounding temperatures (190–260° C.). The half life temperature at 0.1 hours should be greater than 130° C. Half life temperature is the temperature at which one half of the peroxide has decomposed. Suitable but non-limiting examples of such peroxide are: dicumyl peroxide, 2,5-dimethyl-2,5-di-(tert butyl peroxy) hexane, tert-butyl cumyl peroxide, di-(2-tert-butylperoxy-isopropyl) benzene, di-tert-butyl peroxide, 2,5-dimethyl-2,5-di-(tert-butylperoxy)hexyne-3, cumene hydroperoxide. These contain 2 to 20 carbon atoms. The peroxide treated LLDPE may be blended using any of various methods known in the art.

As a result of the treatment the melt strength of the LLDPE is increased. Melt strength is determined as the complex viscosity measured at 190° C. at a shear rate (frequency) of 0.1 l/sec.

In the peroxide treated LLDPE, the numerical values of this viscocity is in the range of 100,000 to 2,000,000 poises, preferably 200,000 to 700,000 poises.

The peroxide treated LLDPE can be then blown into film under the following conditions, which have been used to treat HMW- HDPE but not LLDPE.

Film Production

In accordance with the process of film production, films of 0.3 to 10.0 mils can be produced; in some commercial applications films of about 0.5 mils are required.

In accordance with the invention, a melt of the linear low density polyethylene is fed through a gap in an annular die for extrusion in the form of a tube, which is moved vertically upward. Pressurized air is fed to the interior of the bubble formed by the tube, which blows it to a greatly increased diameter and correspondingly reduced wall thickness and results in biaxial orientation of the film. Cooling air is supplied to the exterior surface of a bubble, while the extruded tube of molten material is being drawn. Further handling usually involves collapsing the tube between a pair of roles to a flattened double-wall web at a stage in the cooling at which the wall surfaces will not adhere to one another. The flattened tube is wound onto a roll and/or further processed.

Cooling air can be supplied to the exterior surface of a bubble by one or more cooling rings, each of which discharges one or more annular streams of cooling air for heat exchange engagement with the bubble exterior surface. Often a primary ring in the immediate neighborhood of the die orifice is employed with a more powerful secondary ring space along the path of the bubble at a location at which sufficiently to withstand the force of the more powerful secondary ring air stream or streams.

These air rings can be configured, prearranged, not only to cool, but also to shape, the tube of molten resin. Controlling the configuration of the tube and bubble, by such air rings is described in U.S. Pat. No. 4,118,453 which is incorporated by reference herein. The internal pressure of the tube is maintained by employing pressurized gas (air) during passage of the tube through the air rings. The apparatus in which such means are used are sometimes referred to as "stalk extruders"; stalk extruders are commercially available from Alpine.

Thus in accordance with the invention the process comprises extruding the peroxide treated LLDPE having complex [ASTM D-4440/84] viscosity at 190° C. and 0.1 radians l/sec greater than $1.5 \times 10^5$ poises through an annular die to form an extruded tube of molten material, cooling the extruded tube while drawing the tube so cooled, expanding the tube to attenuate the walls thereof by introducing a gas in contact with the outer surface of said tube from a plurality of annular zones about said extruded tube spaced along the axis thereof and being of increasing diameter in the direction away from the point of extrusion; the plurality of annular zones can be provided by circular pairs of annular zones about said extruded tube. In U.S. Pat. No. 4,118,453, incorporated by reference herein, as noted above, additional separate pairs of cooling gas confined streams are directed against said film on each side of a shape restricting surface which extend beyond the discharge boundaries of the discharged confined streams; the said additional cooling gas streams are passed in contact with the outer surface of said film tube at each of said shape restricting surfaces to produce a positive gas pressure zone between said surface and said film material and then said cooling gas is withdrawn from such contact between each pair of adjacent cooling gas inlets.

In accordance with the invention the molten linear low density polyethylene, described above, is formed into a tube or bubble having at least two different diameters, the smaller of the two diameters being substantially that of the die and the second diameter of the bubble exceeding that diameter of the die, with a frost height line downstream of the portion of the bubble having said smaller diameter and downstream of the portion of the bubble having said second diameter. The Frost line is the line where the extruded tube or bubble changes from molten to solid character.

While the diameter of the tube is that of the die, the stresses, as well as machine direction (MD) orientation, in the melt relax; this stage of the process has been found to be critical to increase the MD tear resistance and impact resistance. As the tube diameter increases, the pressure increases within the bubble; that is the pressure differential between the inside of the tube and the external surface of the tube increases as the diameter increases. The increase in diameter can be 3:1 to 5:1 and up to 7:1 to 9:1 times the die diameter. This expansion in bubble diameter occurs before the melt turns into a solid. As suggested above, the frost line height is where the film is below its melting point with no more expansion in the transverse direction and so no increase in bubble diameter. The resulting films have thicknesses ranging from 0.2 to 10.0 preferably ranging from 0.3 to 1.5, and most preferably ranging from 0.3 to 1.0.

The resulting films have improved impact resistance (ASTM D1709).

The impact strength of the high stalk extruded peroxide treated LLDPE film is at least 25 percent higher than the corresponding film prepared in a non-stalk manner without the benefit of peroxide treatment.

Accordingly, the film produced under high stalk extrusion with a peroxide treated LLDPE resin, in accordance with one aspect of the invention, exhibits impact resistance that is at least 25% higher than a comparable LLDPE film with the same thickness and density which was made from untreated LLDPE under non-stalk extrusion.

In addition to the LLDPE polymer component, the blend may also contain any of various additives conventionally added to polymer compositions for different purposes, e.g. stabilizers such as antioxidants, pigments, etc. Improvements in impact properties of linear low density polyethylene are realized by blending linear low density polyethylene with polymers, such as impact polystyrene or impact poly (para-methylstyrene). Improvements in impact resistance of linear low density polyethylene has been described to result from blending linear low density polyethylene with impact polystyrene or impact poly(para-methylstyrene). Although the addition of impact polymers can improve impact properties of LLDPE film, the impact polymers, on addition to LLDPE, can reduce the stiffness (modulus) of the resulting film. In the literature, the use of microtalc has been described to act as an antiblocking agent in LLDPE production.

Printing of the resulting films can be undertaken by any conventional method. Gravure printing is generally used for films. Gravure ink consists of pigment (usually organic pigment), a resin binder, and a volatile solvent; it is quite fluid and dries entirely by evaporation. For high speed printing, the solvents are quite volatile and the inking system must be enclosed. Cf. KIRK-OTHMER ENCYCLOPEDIA OF CHEMICAL TECHNOLOGY, VOL. 19. page 155 [Third Edition 1976]

The results of the invention can be realized with peroxides as the sole agents to increase melt strengths; accordingly, the LLDPE blend with the small amounts of peroxide are to be construed to exclude of other when the language "consisting essentially of" or "consisting of" is employed.

The following examples further illustrate the invention.

EXAMPLES ILLUSTRATING THE ESSENCE OF INVENTION

A granular LLDPE base resin (0.922 density, 0.7 MI, 25 MFR) was compounded on a single screw extruder (2 inch Sterling) at 220° C. under nitrogen blanket with 100 ppm of peroxide (Trigonox 101) and 500 ppm each of Irganox 1010 and Irgafos 168. The resultant pellets had a FI of 11.3, MI of 0.26 and a MFR of 43.

The pellets were blown into 1 mil film on the Alpine extruder under the following conditions: melt temperature= 463° C., screw speed 136 RPM, output 94 lbs/hr, BUR 4:1. The film properties were as follows:

| Sample | Frostline Height Inches | Dart Impact F50 gms | MD Tear gms/mil | TD Tear gms/mil |
| --- | --- | --- | --- | --- |
| 1 | 19 | 800 | 142 | 360 |
| 2 | 28 | 630 | 141 | 412 |

A comparative film sample produced with a non-stalk extrusion (2:1 BUR, 1 mils, 120 lbs/hr) on a Brampton 2.5 inch extruder with the base resin (Mobil's NTX-097) would have a dart impact which is substantially poorer (dart impact of 178 gms). The impact strength is increased by over 250 percent over the non-peroxide treated non-stalk film.

The attached graphs illustrate the substantial change in the rheology of the LLDPE resin after crosslinking. The low shear viscosity is increased 3-fold while the low shear elasticity (storage modulus) is increased over 15-fold. The LLDPE resin also becomes more shear thinning as evidenced by the higher slope in the viscosity shear rate curve. By choosing an appropriate base LLDPE resins for crosslinking one could produce easy processing LLDPE resins using this concept.

Thus it is apparent that there has been provided, in accordance with the invention, a blend, that fully satisfies the objects, aims, and advantages set forth above. While the invention has been described in conjunction with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims.

What is claimed is:

1. A process for producing a film, which comprises providing a resin which is a linear low density polyethylene comprising at least 80 percent by weight of ethylene units;

treating the linear low density polyethylene with high temperature peroxide such that a viscosity at 0.1 sec.$^{-1}$ (190° C.) of 100,000 to 2,000,000 poises is achieved extruding said resin through an annular die to form an extruded tube of molten material to provide the tube with a tube diameter which is substantially the annular die diameter the tube having an inner surface and an outer surface;

while continuously extruding the tube, cooling the tube by flowing a cooling gas in contact with the outer surface of said tube from an annular zone about said extruded tube spaced along the axis thereof and having a diameter sufficient to provide a tube diameter which is substantially the annular die diameter, the annular zone operating to cool the tube in the absence of cooling gas from another annular zone;

expanding the tube, downstream of said annular die and said annular zone, to attenuate the walls thereof to form the tube of molten material into a bubble of a bubble diameter which exceeds (1) the annular die diameter and (2) the tube diameter;

wherein said bubble has a frost line which comprises a demarcation line between said molten material and solid biaxially oriented film; and producing said film of a thickness ranging from 0.3 to 10.0 mils, exhibiting an improvement in impact strength, determined by ASTM D-1709 of at least 25 percent over a comparable film made from a non-peroxide treated LLDPE under non-stalk film flowing conditions; and producing said film.

2. The process of claim 1, which further includes expanding the tube to attenuate the walls to form said bubble by increasing the pressure within the tube to create a positive pressure differential between the inside of the tube and the outer surface of the tube.

3. The process of claim 1, wherein the tube diameter increases so that the ratio of tube diameter to die diameter ranges from 3:1 to 5:1.

4. The process of claim 1, wherein the tube diameter increases so that the ratio of tube diameter to die diameter ranges from 7:1 to 9:1.

* * * * *